United States Patent
Pauwels et al.

(10) Patent No.: US 11,564,021 B2
(45) Date of Patent: Jan. 24, 2023

(54) NETWORK TERMINATION UNIT AND LINE TERMINATION UNIT

(71) Applicant: NOKIA SOLUTIONS AND NETWORKS OY, Espoo (FI)

(72) Inventors: Bart Pauwels, Tessenderlo (BE); Michaël Fivez, Lier (BE); Koenraad Schelfhout, Zwijndrecht (BE); Koen De Schepper, Boortmeerbeek (BE); Carl Mertens, Brasschaat (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/473,055

(22) Filed: Sep. 13, 2021

(65) Prior Publication Data

US 2022/0086542 A1   Mar. 17, 2022

(30) Foreign Application Priority Data

Sep. 14, 2020 (EP) ..................... 20195916

(51) Int. Cl.
*H04Q 11/00* (2006.01)

(52) U.S. Cl.
CPC ..... *H04Q 11/0066* (2013.01); *H04Q 11/0005* (2013.01); *H04Q 11/0067* (2013.01); *H04Q 2011/0073* (2013.01); *H04Q 2011/0079* (2013.01); *H04Q 2011/0086* (2013.01)

(58) Field of Classification Search
CPC .................................................. H04Q 11/0066
See application file for complete search history.

(56) References Cited

U.S. PATENT DOCUMENTS

| | | | |
|---|---|---|---|
| 7,385,995 B2 | 6/2008 | Stiscia et al. | |
| 7,508,759 B2 | 3/2009 | Shimada | |
| 7,602,800 B2 | 10/2009 | Endo et al. | |
| 7,672,233 B2 | 3/2010 | Koch et al. | |
| 8,787,758 B2 | 7/2014 | Kramer et al. | |

(Continued)

OTHER PUBLICATIONS

Extended European Search Report mailed in corresponding EP20195916.0 dated Mar. 19, 2021, 11 pages.

(Continued)

*Primary Examiner* — Shi K Li
(74) *Attorney, Agent, or Firm* — Tong, Rea, Bentley & Kim, LLC

(57) ABSTRACT

A distribution network with point-to-multipoint architecture couples a line termination unit to a plurality of network termination units. A network termination unit includes one or more user network interfaces configured to interface with respective user equipment of respective users, a downstream packet buffer for temporary storage of data packets, a downstream packet buffer monitor configured to monitor the status of the downstream packet buffer and to generate back-pressure signals indicative for the status, wherein the status corresponds to a fill level or fill level variation of the downstream packet buffer, and an upstream transmitter configured to upstream transmit the back-pressure signals to the line termination unit to be used there for shaping and/or scheduling future downstream transmission of data packets to the one or more user network interfaces.

20 Claims, 5 Drawing Sheets

(56) References Cited

U.S. PATENT DOCUMENTS

| | | | | |
|---|---|---|---|---|
| 2004/0141759 A1* | 7/2004 | Stiscia | ............... | H04L 63/0428 |
| | | | | 398/58 |
| 2008/0089351 A1* | 4/2008 | Hu | ......................... | H04L 47/30 |
| | | | | 370/235 |
| 2010/0318686 A1* | 12/2010 | Ver Steeg | .......... | H04L 41/0856 |
| | | | | 709/217 |
| 2013/0028088 A1* | 1/2013 | Do | ....................... | H04L 1/1887 |
| | | | | 370/235 |
| 2013/0114961 A1* | 5/2013 | Stiscia | .............. | H04B 10/2575 |
| | | | | 398/67 |

OTHER PUBLICATIONS

Choudhury, P., et al., "Efficient Queue Based Dynamic Bandwidth Allocation Scheme for Ethernet PONs," IEEE Global Telecommunications Conference (IEEE GlobeCom) 2007, Nov. 2007, 5 pages.

\* cited by examiner

NETWORK TERMINATION UNIT AND LINE TERMINATION UNIT

CROSS-REFERENCE TO RELATED APPLICATIONS

This application is based on and claims the benefit of European Patent Application No. 20195916.0, filed on Sep. 14, 2020, which is hereby incorporated herein by reference in its entirety.

TECHNICAL FIELD

Various example embodiments relate to a network termination unit and line termination unit for use in a system with point-to-multipoint distribution network coupling the line termination unit to a plurality of network termination units over a shared medium.

BACKGROUND

In data transmission systems with a point-to-multipoint architecture, a line termination unit (abbreviated LT) is coupled to a plurality of network termination units (abbreviated NTs) through a distribution network with point-to-multipoint architecture that serves as a shared transmission medium for downstream transmission, i.e. transmission in the direction from the line termination unit to the network termination units. The line termination unit is located at a central office. A network termination unit is located at a distribution point or at subscriber premises, jointly called network endpoints, and typically has one or plural user network side interfaces (abbreviated UNIs) to further interface with user equipment.

An example of such a data transmission system is a Passive Optical Network. Therein, an optical line termination (abbreviated OLT) located at a central office is coupled to a plurality of optical network units (abbreviated ONUs) located at optical endpoints through an optical distribution network (abbreviated ODN). The ONUs may also be named optical network terminations (abbreviated ONTs) when located at subscriber premises for instance. The ODN has a point-to-multipoint architecture, typically consisting of a single optical fibre extending from the OLT (named the feeder fibre), a passive optical splitter/combiner, and multiple fibres between the optical splitter/combiner and respective ONUs (named the distribution fibres or drop fibres). The passive splitter/combiner splits the optical signal in the downstream direction from OLT to ONUs, and multiplexes the optical signals in the upstream direction from ONUs to OLT. To avoid collisions on the shared part of the ODN, a time-division multiplexing (abbreviated TDM) protocol is used in the downstream direction and a time-division multiple access (abbreviated TDMA) protocol is used in the upstream direction. The TDM and TDMA protocols are defined in different ITU-T standard specifications, depending on the PON flavour. Currently, TDM-PONs with downstream throughput capacity of 10 to 50 Gbit/s (Gigabit per second) and upstream throughput capacity of 10 Gbit/s to 25 Gbit/s are deployed. In existing PON technologies like GPON which is the abbreviation of Gigabit Passive Optical Network, XGPON, which is the abbreviation of 10 Gigabit Passive Optical Network, XGS-PON, which is the abbreviation of 10 Gigabit Symmetrical Passive Optical Network, NGPON2, which is the abbreviation of Next Generation Passive Optical Network 2, G.HSP, which is the abbreviation of Higher Speed Passive Optical Network, all referred to as "GPON" in the current patent application, an upstream timeframe with predefined length of for instance 125 microseconds is subdivided in fixed length or variable length time intervals. Depending on the number of active ONUs in the PON and their respective service and/or latency demands, a dynamic bandwidth assignment (DBA) controller allocates time intervals to ONUs. Such an allocation or grant allows a single ONU to transmit an upstream burst in a time interval assigned to that ONU. The DBA typically makes use of an upstream buffer in the ONU. Upstream buffer occupation information may be communicated to the OLT that may be used for bandwidth allocation. This feedback mechanism from ONU to OLT however has no impact on downstream traffic regulation.

Another example of such a data transmission system is a multipoint digital subscriber loop (abbreviated multipoint DSL). Therein, a multipoint transceiver unit at central office side (abbreviated MTU-O) is coupled to a plurality of multipoint transceiver units at remote side (abbreviated MTU-Rs) through shared twisted pair or coax wiring. The ITU-T G.mgfast standard specification targets to achieve downstream data rates of 10 Gbit/s over a single twisted pair or coax cable. Like in a PON, upstream buffer occupancy is communicated by each MTU-R to the MTU-O and used at the MTU-O for dynamic rate adaptation (abbreviated DRA). Again, this feedback mechanism from MTU-R to MTU-O does not regulate downstream traffic.

In the downstream direction, the downstream physical layer data rate on the shared medium of the distribution network may exceed the physical layer data rate that can be achieved on an individual UNI. As a consequence, a NT may be a rate adaptation contention point for downstream traffic destined to UNIs served by the NT. In particular when no or little downstream traffic is transmitted to other NTs, a large part of the downstream capacity of the shared medium may be used to transport downstream traffic to a particular NT. In case the aggregate downstream data rate at the LT network interface is not reduced to the maximum data rate of the UNIs served by an NT, the NT has to contain a data rate adaptation contention buffer that is sufficiently large to temporarily store all excess downstream data packets destined to UNIs served by the NT. The maximum size of this buffer depends on the length of the downstream burst of data to the concerned UNI that may be sent by the LT at a data rate exceeding the maximum data rate of the UNI.

The traditional solution for contention caused by data rate adaptation at the NT is found in equipping the NT with a downstream data packet buffer that is large enough to anticipate worst case downstream traffic load and traffic distribution patterns, without control by the NT. Such downstream data rate adaptation contention buffer in the NT can be provisioned either externally through external Dynamic Random Access Memory (abbreviated DRAM) devices, or internally by incorporating sufficient dedicated internal memory in the NT logic itself. Both the external and internal provisioning of data packet buffer capacity however face difficulties.

DRAM devices typically have a large minimum memory capacity that grows with the evolution of technology used to manufacture them. The size of an external data packet buffer provisioned through DRAM devices therefore is primarily governed by the data access rate of such memory. Achieving a sufficiently large data access rate for example for state-of-the-art GPON systems (with an aggregate downstream data rate of 10 Gbit/s to 50 Gbit/s) requires parallelised access to multiple DRAM devices for writing or reading all bits of a same data packet block at a speed sufficiently high to keep up with the downstream GPON data rate. A data packet buffer provisioned as a parallel configuration of DRAM devices to achieve the necessary data access speed however often results in massive over-dimensioning of the required data packet buffer size relative to the actual needs for handling the excess NT traffic load. Also, a dedicated physical interface for access to the DRAM has to be provisioned in the GPON MAC (Media Access Controller). An external data packet buffer for data rate adaptation contention in an NT hence becomes expensive in view of the amount of data it is supposed to contain at maximum.

When provisioned internally in the NT, the data packet buffer memory is realized through an Application Specific Integrated Circuit (abbreviated ASIC) or Field Programmable Gate Array (abbreviated FPGA). The size of such internal data packet buffer can be tailored to the burst size and amount of data rate adaptation to be exerted on the downstream data received from the LT before transmission on individual destined UNIs of the NT. Still, for GPON technology, this required data packet memory size is often larger than the technological upper bound for internal memory in an ASIC or FPGA at acceptable cost.

When looking at both implementation options, it has to be concluded that it is not possible to reduce the packet buffer memory access data rate if an OLT to ONU communication has to be capable of exploiting the full capacity of the GPON link. It is consequently an aim to reduce the required minimum size of the data packet buffer in a network termination unit to a level that is feasible in internal memory at an acceptable cost.

A straightforward solution that avoids the need for a larger data packet memory in the NT resides in shaping the LT egress data rate destined to a particular UNI to a rate that does not exceed the capacity of the physical layer interface of that UNI. However, this requires that the LT is able to perform scheduling at this level and that the operator of the LT accepts to actively configure the scheduling in the LTs of the networks managed by that operator. Usually, operators are not prepared thereto.

A different solution to avoid the need for a larger data packet memory in the NT could reside in communicating the UNI physical data rate to a broadband remote access switch (abbreviated BRAS), i.e. a node deeper in the network that has a view on the data flows destined to a particular UNI. The BRAS can then shape the aggregated traffic to that UNI such that the UNI's physical layer capacity is not exceeded and large data packet queue build-up in the NT becomes impossible. This second solution however requires that all traffic destined to a particular UNI passes through a single BRAS which may not be desirable in particular network configurations.

SUMMARY

The scope of protection sought for various embodiments of the invention is set out by the independent claims.

The embodiments and features described in this specification that do not fall within the scope of the independent claims, if any, are to be interpreted as examples useful for understanding various embodiments of the invention.

Amongst others, it is an objective of embodiments of the present invention to disclose a network termination unit and line termination unit that allow to reduce the required minimum size of the downstream data packet buffer in the network termination unit to a level that is feasible in internal memory at an acceptable cost. It is also an objective to avoid that the operator of the line termination unit is forced to manage active scheduling at the level of the physical layer capacity of individual UNIs. It is a further objective to avoid that the aggregate downstream data traffic destined to a particular UNI has to pass through a single network element like a BRAS.

This object is achieved, according to a first example aspect of the present disclosure, by a network termination unit as defined by claim 1, configured to be connected to a distribution network with point-to-multipoint architecture that couples a line termination unit to a plurality of network termination units including the network termination unit, wherein the network termination unit comprises:

a downstream receiver configured to receive data packets downstream transmitted from the line termination unit to the plurality of network termination units;

one or more user network interfaces configured to interface with respective user equipment of respective users;

a downstream packet buffer for storage of data packets received by the downstream receiver and destined for the one or more user network interfaces;

a downstream packet buffer monitor configured to monitor the status of the downstream packet buffer and to generate back-pressure signals indicative for the status, wherein the status corresponds to a fill level or fill level variation of the downstream packet buffer; and an upstream transmitter configured to upstream transmit the back-pressure signals to the line termination unit.

In example embodiments of the network termination unit, as set out in claim 2, the status comprises information directly or indirectly indicative for the risk of buffer overrun resulting from an excessive share of data packets destined for the one or more user network interfaces in the data packets downstream transmitted by the line termination unit.

In example embodiments of the network termination unit set out in claim 3:

the downstream packet buffer comprises user network interface related queues associated with respective ones of the one or more user network interfaces; and the status comprises a status for each of the one or more user network interface related queues.

In sample embodiments of the network termination unit as set out in claim 4:

the downstream packet buffer comprises plural quality-of-service related queues associated with respective quality-of-service classes; and the status comprises a status for each of the quality-of-service queues.

In sample embodiments of the network termination unit as set out in claim 5:

the network termination unit is an optical network unit, abbreviated ONU.

In sample embodiments of the network termination unit defined by claim 6:

the distribution network is an optical distribution network, abbreviated ODN, the line termination unit is an optical line termination, abbreviated OLT;

the OLT, the ODN and the plurality of ONUs jointly form a passive optical network, abbreviated PON; and the back-pressure signals are transmitted in the Options field of the upstream frame header as specified in an ITU-T PON specification.

In sample embodiments of the network termination unit as defined by claim 7:

the network termination unit is a Digital Subscriber Loop multipoint transceiver unit at remote side, abbreviated DSL MTU-R.

The above-defined object is achieved, according to a second example aspect of the present disclosure, by a line termination unit as defined by claim 8, configured to be connected to a distribution network with point-to-multipoint architecture that couples the line termination unit to a plurality of network termination units, wherein the line termination unit comprises:

- a plurality of per-user traffic managers, each per-user traffic manager comprising a per-user packet buffer configured to temporarily store data packets destined for a particular user network interface of one of the network termination units;
- a downstream scheduler configured to schedule downstream transmission of data packets across the plurality of per-user traffic managers;
- an upstream receiver configured to receive back-pressure signals upstream transmitted by the plurality of network termination units, each back-pressure signal being indicative for the status of a downstream packet buffer in a network termination unit of the plurality of network termination units, wherein the status corresponds to a fill level or fill level variation of the downstream packet buffer;
- the downstream scheduler being configured for shaping and/or scheduling future downstream transmission of data packets based on the back-pressure signals.

In sample embodiments of the line termination unit defined by claim 9, the downstream scheduler is configured to stop scheduling data packets destined to a particular user network interface if:

- the backpressure signal indicates that a fill level of said downstream packet buffer exceeds a threshold; or
- the backpressure signal indicates that a fill level growth of the downstream packet buffer exceeds a threshold; or
- the backpressure signal indicates that a fill level of the downstream packet buffer approximates a target fill level.

In sample embodiments of the line termination unit defined by claim 10, the downstream scheduler is configured to reduce the rate of scheduling data packets destined to a particular user network interface by a factor if:

- the backpressure signal indicates that a fill level of the downstream packet buffer exceeds a threshold; or
- the backpressure signal indicates that a fill level growth of the downstream packet buffer exceeds a threshold; or
- the backpressure signal indicates that a fill level of said downstream packet buffer approximates a target fill level.

In sample embodiments of the line termination unit defined by claim 11, the factor is configurable based on said backpressure signal.

In sample embodiments of the line termination unit defined by claim 12, the downstream scheduler is configured to increase the rate of scheduling data packets destined to a particular user network interface by a factor if:

- the backpressure signal indicates that a fill level of the downstream packet buffer drops below a threshold; or
- the backpressure signal indicates that a fill level growth of the downstream packet buffer drops below a threshold.

In sample embodiments of the line termination unit defined by claim 13, the factor is configurable based on said backpressure signal.

In sample embodiments of the network termination unit as defined by claim 14,
the line termination unit is an optical line termination, abbreviated OLT.

In sample embodiments of the network termination unit as defined by claim 15,
the line termination unit is a Digital Subscriber Loop multipoint transceiver unit at central office side, abbreviated DSL MTU-O.

The above-defined object is achieved, according to a further example aspect of the present disclosure, by a network termination method, used in a system with distribution network with point-to-multipoint architecture that couples a line termination unit to a plurality of network termination units, wherein the network termination method comprises:

- receiving data packets downstream transmitted from the line termination unit to the plurality of network termination units;
- extracting data packets downstream transmitted and destined for one or more user network interfaces configured to interface with respective user equipment of respective users;
- temporarily storing the data packets destined for the one or more user network interfaces in a downstream packet buffer;
- monitoring the status of the downstream packet buffer and generating back-pressure signals indicative for the status, wherein the status corresponds to a fill level or fill level variation of the downstream packet buffer; and
- upstream transmitting the back-pressure signals to the line termination unit.

According to a further example aspect an apparatus is disclosed, comprising at least on processor and at least one memory comprising computer program code, the at least one memory and the computer program code being configured to, with the at least one processor cause the in a system with distribution network with point-to-multipoint architecture that couples a line termination unit to a plurality of network termination units, to perform at least the following:

- receiving data packets downstream transmitted from the line termination unit to the plurality of network termination units;
- extracting data packets downstream transmitted and destined for one or more user network interfaces configured to interface with respective user equipment of respective users;
- temporarily storing the data packets destined for the one or more user network interfaces in a downstream packet buffer;
- monitoring the status of the downstream packet buffer and generating back-pressure signals indicative for the status, wherein the status corresponds to a fill level or fill level variation of the downstream packet buffer; and
- upstream transmitting the back-pressure signals to the line termination unit.

According to a further example aspect a computer program product is disclosed, comprising computer-executable instructions for causing a network termination in a system with distribution network with point-to-multipoint architecture that couples a line termination unit to a plurality of network termination units, to perform at least the following:

- receiving data packets downstream transmitted from the line termination unit to the plurality of network termination units;
- extracting data packets downstream transmitted and destined for one or more user network interfaces configured to interface with respective user equipment of respective users;

temporarily storing the data packets destined for the one or more user network interfaces in a downstream packet buffer;

monitoring the status of the downstream packet buffer and generating back-pressure signals indicative for the status, wherein the status corresponds to a fill level or fill level variation of the downstream packet buffer; and upstream transmitting the back-pressure signals to the line termination unit.

According to a further example aspect a computer readable storage medium is disclosed, comprising computer-executable instructions for performing the following steps when the program is run in a network termination in a system with distribution network with point-to-multipoint architecture that couples a line termination unit to a plurality of network termination units, to perform at least the following:

receiving data packets downstream transmitted from the line termination unit to the plurality of network termination units;

extracting data packets downstream transmitted and destined for one or more user network interfaces configured to interface with respective user equipment of respective users;

temporarily storing the data packets destined for the one or more user network interfaces in a downstream packet buffer;

monitoring the status of the downstream packet buffer and generating back-pressure signals indicative for the status, wherein the status corresponds to a fill level or fill level variation of the downstream packet buffer; and upstream transmitting the back-pressure signals to the line termination unit.

The above-defined object is achieved, according to a further example aspect of the present disclosure, by a line termination method, used in a system with a distribution network with point-to-multipoint architecture that couples a line termination unit to a plurality of network termination units, wherein the line termination method comprises:

temporarily storing data packets destined for a particular user network interface of one of the network termination units in a per-user data buffer of a per-user traffic manager;

scheduling downstream transmission of data packets across a plurality of per-user traffic managers;

receiving back-pressure signals upstream transmitted by the plurality of network termination units, each back-pressure signal being indicative for the status of a downstream packet buffer in a network termination unit of the plurality of network termination units, wherein the status corresponds to a fill level or fill level variation of the downstream packet buffer; and shaping and/or scheduling future downstream transmission of data packets based on the back-pressure signals.

According to a further example aspect an apparatus is disclosed, comprising at least on processor and at least one memory comprising computer program code, the at least one memory and the computer program code being configured to, with the at least one processor cause the in a system with distribution network with point-to-multipoint architecture that couples a line termination unit to a plurality of network termination units, to perform at least the following:

temporarily storing data packets destined for a particular user network interface of one of the network termination units in a per-user data buffer of a per-user traffic manager;

scheduling downstream transmission of data packets across a plurality of per-user traffic managers;

receiving back-pressure signals upstream transmitted by the plurality of network termination units, each back-pressure signal being indicative for the status of a downstream packet buffer in a network termination unit of the plurality of network termination units, wherein the status corresponds to a fill level or fill level variation of the downstream packet buffer; and shaping and/or scheduling future downstream transmission of data packets based on the back-pressure signals.

According to a further example aspect a computer program product is disclosed, comprising computer-executable instructions for causing a line termination in a system with distribution network with point-to-multipoint architecture that couples the line termination unit to a plurality of network termination units, to perform at least the following:

temporarily storing data packets destined for a particular user network interface of one of the network termination units in a per-user data buffer of a per-user traffic manager;

scheduling downstream transmission of data packets across a plurality of per-user traffic managers;

receiving back-pressure signals upstream transmitted by the plurality of network termination units, each back-pressure signal being indicative for the status of a downstream packet buffer in a network termination unit of the plurality of network termination units, wherein the status corresponds to a fill level or fill level variation of the downstream packet buffer; and shaping and/or scheduling future downstream transmission of data packets based on the back-pressure signals.

According to a further example aspect a computer readable storage medium is disclosed, comprising computer-executable instructions for performing the following steps when the program is run in a line termination in a system with distribution network with point-to-multipoint architecture that couples the line termination unit to a plurality of network termination units, to perform at least the following:

temporarily storing data packets destined for a particular user network interface of one of the network termination units in a per-user data buffer of a per-user traffic manager;

scheduling downstream transmission of data packets across a plurality of per-user traffic managers;

receiving back-pressure signals upstream transmitted by the plurality of network termination units, each back-pressure signal being indicative for the status of a downstream packet buffer in a network termination unit of the plurality of network termination units, wherein the status corresponds to a fill level or fill level variation of the downstream packet buffer; and shaping and/or scheduling future downstream transmission of data packets based on the back-pressure signals.

The above-defined object is achieved, according to a further example aspect of the present disclosure, by a system comprising:

a line termination unit as defined in one of claims 8-15;

a plurality of network termination units as defined in one of claims 1-7; and a distribution network coupling the line termination unit to the plurality of network termination units.

BRIEF DESCRIPTION OF THE DRAWINGS

Some example embodiments will now be described with reference to the accompanying drawings.

DETAILED DESCRIPTION OF EMBODIMENT(S)

Figure 1:
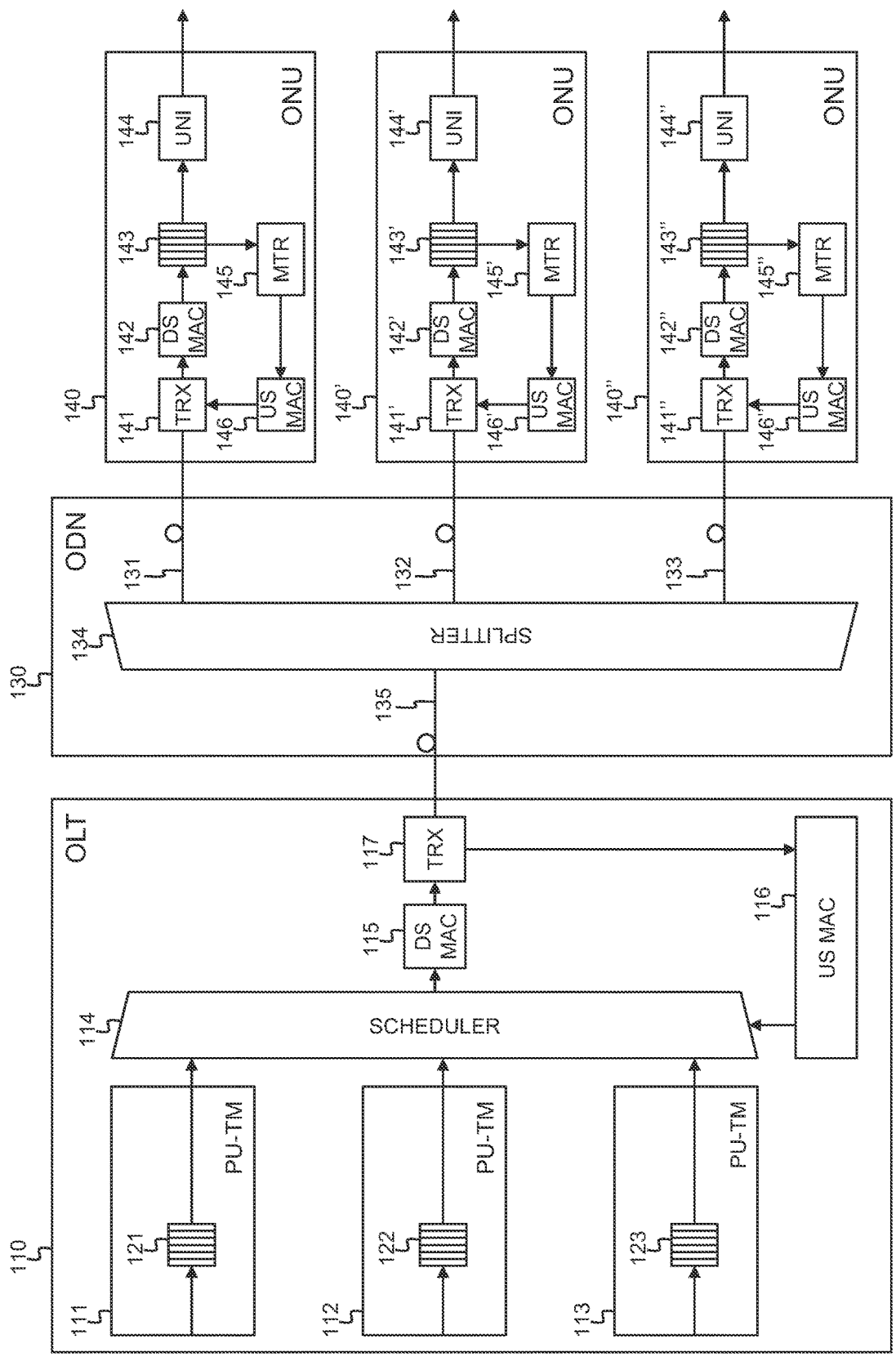
FIG. 1 illustrates a first example embodiment of a system comprising a line termination unit 110, distribution network 130, and network termination units 140.

Embodiments of the invention can reside in a network termination unit (abbreviated NT) equipped with a downstream data packet buffer which will now be able to absorb downstream rate adaptation contention resulting from aggregate downstream data rates from the line termination (abbreviated LT) that exceed the maximum physical layer data rates of individual user network interfaces (abbreviated UNIs) at the NT. Such an embodiment of a network termination unit is configured to monitor and report the instantaneous status of the data packet buffer to the LT to enable the latter to shape or schedule future downstream data transmissions destined to the UNIs served by the NT. The back-pressure signal that informs the LT on the status of the data packet buffer may contain status information at the level of the aggregate data packet buffer, when for instance a single data packet buffer is shared by the different UNIs served by the NT. Alternatively, the back-pressure signal may contain status information per share of the data packet buffer that is used by an individual UNI, if for instance the data packet buffer is subdivided in individual queues (either physically or logically) for individual UNIs. In yet another alternative implementation, the back-pressure signal may contain status information per quality-of service (abbreviated QoS) class, if for instance the data packet buffer comprises a set of queues (either physically or logically) respectively storing data packets belonging to different QoS classes (or more generally priorities) per UNI. Determination and provision of such more fine-grained back-pressure signals by the NT to the LT can help to allow the LT to schedule the future downstream transmission of data packets destined to a particular UNI in view of the status of the UNI-specific queue status in the data packet buffer, and/or to schedule the future downstream transmission of data packets of a particular QoS class destined to a particular UNI in view of the status of the QoS-specific queue status for that UNI in the data packet buffer.

The back-pressure signals may be upstream transmitted at regular, periodic time intervals or the upstream transmission thereof may happen irregularly, on a need basis like for instance each time meaningful changes are monitored in the NT data packet buffer status or individual UNI queue or QoS queue status. The latency in the feedback loop however must be small enough to allow the LT to reduce the scheduling of downstream data packets destined to one or more UNIs served by the NT sufficiently fast to avoid the provision of a cost-ineffective, large packet buffer for absorbing excessive traffic in between detection of the increased fill level and reduction of the downstream data packet rate towards that NT.

The status of the data packet buffer or of a UNI queue or QoS queue therein may comprise the fill level of such buffer or queue (like for instance the absolute fill level value or the passing of one or more fill level thresholds) and/or the variation in fill level (like for instance the difference from a previous fill level measurement, or the growth rate, where it is noticed that both the difference and growth can be negative values in case the packet buffer or queue length is decreasing).

Depending on the nature of the back-pressure signal (i.e. regular or when needed), the nature of the status information (i.e. fill level, fill level variation, or threshold passing), and the desired resolution, the back-pressure signal can be a binary signal (for example a single bit), a code point (for example a predefined code indicating that a particular filling level is reached), or an exact value (for example representing the queue length at a specified time). The back-pressure signal also can be a set of binary signals, a set of code points or a set of exact values in case it contains information for plural individual UNI-specific queues or plural individual QoS-specific queues.

It is noticed that embodiments of the network termination unit may serve a single UNI or may serve plural UNIs. Each UNI provides connectivity to user equipment, like for instance a modem, wireless access point, computer, laptop, television, tablet computer, mobile phone, or any other network connected device. The UNI may be of various nature, wired or wireless, like for instance an Ethernet interface, an HDMI, USB, USB-C, WiFi, Bluetooth, etc. Possibly, the UNI can also be incorporated in the end user equipment.

As mentioned above, the status of the downstream packet buffer comprises the fill level and/or the fill level variation of this buffer. Depending on the desired resolution and impact on the upstream channel, the fill level and/or the fill level variation may be expressed in one or more bits, codepoints or absolute values. In order to be effective, the status information must indicate directly (through absolute values or percentages) or indirectly (through passing of thresholds that are predefined in function of expected upstream travel time of the back-pressure signals and the maximum aggregate downstream data rate) the risk for buffer overrun. Determination and provision of this information by the NT to the LT will help to enable the LT to take adequate scheduling action to avoid such buffer overrun. The content and timing of the back-pressure signal preferably warrant that the amount of data packets that can be downstream transmitted over the shared distribution network between LT and NT within the time interval needed for the back-pressure signal to reach the LT cannot fill the downstream packet buffer in the NT completely.

In case the NT serves plural UNIs, the share of the data packet buffer occupied by data packets destined for each UNI may be monitored individually, and the individual UNI queue length or growth in the data packet buffer may be reported as part of the status information in the back-pressure signal. This brings the advantage that this information provided to the LT can enable the LT to shape or schedule the downstream traffic at UNI level. Downstream data transmission destined to a UNI whose physical layer data rate is sufficiently high to avoid excessive growth of its UNI queue need not unnecessarily be reduced in situations where the downstream data packet buffer at the NT is growing because of data rate adaptation contention caused by another UNI served by the NT.

In case the NT supports QoS, the share of the data packet buffer occupied by data packets of a particular QoS class may be monitored for each UNI, and the individual QoS queue length or growth in the data packet buffer may be reported as part of the status information in the back-pressure signal. This enables the LT to apply QoS aware shaping or scheduling and manage the share of each individual QoS queue within the larger share of the data packet buffer taken by the set of QoS queues that serve a single physical UNI output port.

Embodiments of the invention can be realized in a PON, for instance a GPON wherein an optical distribution network or ODN with tree-and-branch architecture or point-to-multipoint architecture couples an optical line termination or OLT to plural optical network terminations or ONUs. The ODN is a shared medium. All ONUs receive the same downstream distributed data frames and extract therefrom the data packets that are intended for the UNIs they respectively serve. With downstream rates up to 50 Gbit/s on the ODN and UNI egress rates up to 10 Gbit/s, each ONU represents a data rate adaptation contention point that must be equipped with a downstream data rate adaptation packet buffer. The required size of such downstream data rate adaptation packet buffer can be kept below a level below the technological upper bound of internal memory realized in ASICs/FPGAs by monitoring the buffer status and reporting the status to the OLT to allow the OLT to shape or schedule future downstream traffic to an ONU that serves certain UNIs thereby avoiding buffer overrun at the ONU.

The ITU-T XGSPON standard specification foresees in an upstream frame with header, the so-called XGEM header, and payload, the so-called XGEM payload. In the XGEM header, a currently unspecified 18 bit long Options field is foreseen. This 18 bit long Options field can be exploited to report the status of the downstream data packet buffer in ONUs to the OLT. Embedding the back-pressure signals in a fixed position of the PON overhead channel, for example in the Options field of the XGSPON upstream frame header, brings the advantage that no new message or channel must be foreseen at the PON management layer or Ethernet data link layer to convey the buffer status information in upstream direction.

It is noticed that alternative embodiments of the invention may be contemplated in systems that rely on different physical layer technologies. As an example, alternate embodiments may be realised in a multipoint DSL wherein twisted pair wiring or coax wiring couples a multipoint transceiver unit at the central office side or MTU-O to plural multipoint transceiver units at the remote side or MTU-Rs. Also in current or future DSL standards, the upstream frame headers may be provided with one or more optional fields that can be exploited by embodiments of the invention to report the status of the downstream data packet buffer from an MTU-R to the MTU-O.

Embodiments of the line termination or LT are equipped with an upstream receiver able to receive a back-pressure signal that contains status information for the downstream packet buffers in the NTs. The LT extracts and interprets the status information from the back-pressure signals and uses the status information to control its downstream scheduler. The downstream scheduler shapes or schedules downstream transmissions by selecting the per-user packet buffer(s) that are allowed to release a data packet for downstream transmission. If the status information received from an NT indicates that the downstream buffer of that NT risks buffer overrun (for example because the fill level of that buffer exceeds a certain threshold, or because the fill level growth exceeds a certain threshold), the downstream scheduler in the LT shall reduce the scheduling rate for per-user packet buffers that store data packets destined to UNIs served by that NT, or even stop scheduling per-user packet buffers that store data packets destined to UNIs served by that NT. Thus, even if the downstream capacity of the distribution network allows to transmit at higher data rates, the back-pressure mechanism with status information for downstream packet buffers in the NTs shall automatically control the downstream scheduling of data packets to one or more UNIs served by an NT as a function of the instantaneous fill level and/or fill level variation of the downstream data storage provisions at that NT. As a consequence, other NTs may temporarily get a higher share in the downstream channel or part of the downstream channel may be left unused temporarily, thereby avoiding that internal data packet memories are to be provided with a size larger than the technological upper bound for internal memory in ASICs/FPGAs, or avoiding that largely over-dimensioned parallel configured DRAMs must serve as external data packet memories for NTs.

Receiving an indication of a change in the fill level and/or the duration of such a change from the NT may trigger a change in the rate at which data packets destined to that NT are scheduled at the LT. In certain embodiments of the LT, the downstream scheduler may temporarily stop scheduling data packet transfer to an NT until it receives status information indicating that the fill level of the NT's downstream rate adaptation contention buffer has dropped below a certain threshold. Temporarily suspending the scheduling of data packet transfer to one or more UNIs served by an NT may for instance be triggered when the status information in the backpressure signal received from that NT indicates that the fill level of its buffer has exceeded a predetermined threshold. This threshold may be a single predefined threshold, the exceeding of which is reported by setting a single bit in the backpressure signal. The threshold also may be one out of plural predefined thresholds, for instance the upper threshold, the exceeding of which can be reported by setting a dedicated bit associated with that threshold in the back-pressure signal or by incorporating a specific codepoint associated with that threshold in the backpressure signal. Suspending the scheduling of data packets to a particular NT may also be triggered when the growth of the fill level exceeds a certain threshold. If the status report contains an absolute value of the fill level of the buffer, the status reported by the NT may for instance be compared with the previous status report of that NT. The difference between both is a measure for the fill level growth. When this fill level growth exceeds a predefined fill level growth threshold, the downstream scheduler in the LT may temporarily suspend scheduling downstream data packet transfer to one or more UNIs served by the NT as a result of which the fill level will automatically stop growing. Yet another example embodiment wherein the downstream scheduler may stop scheduling downstream transmission towards one or more UNIs served by an NT, relies on comparison of the reported status by that NT with a target status that was calibrated for a steady state condition. A deviation from the target status that exceeds a certain deviation threshold may again trigger temporary suspension of the scheduling of downstream packet transfer to that NT, for instance until it is reported by the NT that the fill level of its downstream packet buffer has dropped below a certain threshold. The buffer in the NT has to handle up to three contention phenomena: arrival distribution related contention, data rate adaptation related contention, and contention due to a temporary throughput reduction caused by deterioration of the UNI data channel quality (the latter in particular for DSL or wireless connections). The target status or steady state may then for instance be a threshold at a given fraction of the maximum buffer filling caused by a given arrival distribution. Filling above that level can be an indication of excessive data rate adaptation related contention and/or deterioration of the UNI data channel quality, which then requires action in the LT. The skilled person will appreciate that depending on the nature and pace of the backpressure signal reporting the status of the NT's downstream packet buffer, other conditions may be set at the LT downstream scheduler to stop scheduling data packet transfer to the NT.

As mentioned here above, indication of a change in the fill level and/or the duration of such a change from the NT may trigger a change in the rate at which data packets destined to that NT are scheduled at the LT. In certain embodiments of the LT, the downstream scheduler may react on a status report by reducing the scheduling rate for data packet transfer to an NT by a factor, for example until it receives status information indicating that the fill level of the NT's downstream rate adaptation contention buffer has again dropped below a certain threshold. Temporarily reducing the scheduling rate for data packet transfer to one or more UNIs served by an NT may for instance be triggered when the status information in the backpressure signal received from that NT indicates that the fill level of its buffer has exceeded a predetermined threshold. This threshold may be a single predefined threshold, the exceeding of which is reported by setting a single bit in the backpressure signal. The threshold also may be one out of multiple predefined buffer size thresholds, the exceeding of which can be reported by setting a dedicated bit associated with that size threshold in the backpressure signal or by incorporating a specific codepoint associated with that size threshold in the backpressure signal. The factor applied for reducing the downstream scheduling rate may be different for different size thresholds. The exceeding of a higher size threshold or of multiple buffer size thresholds may for instance result in the scheduling rate being reduced by a higher factor than the exceeding of a lower size threshold out of the set of buffer size thresholds. Reducing the scheduling rate for data packets to a particular NT may also be triggered when the growth of the fill level exceeds a certain threshold. If the status report contains an absolute value of the fill level of the buffer, the status as received from the NT may for instance be compared with the previous status as received from that NT. The LT is then configured to compare both and when this difference exceeds a predefined level, called the fill level growth threshold, the downstream scheduler in the LT may reduce the scheduling rate to one or more UNIs served by the NT. The applied factor may again vary in function of the fill level growth threshold if plural fill level thresholds are predefined. Yet another example embodiment wherein the downstream scheduler may reduce the scheduling rate towards one or more UNIs served by an NT, relies on comparison of the status as received from that NT with a target status that was calibrated for a steady state condition. Approaching the target status or exceeding the target status by a certain deviation threshold may trigger a reduction by a factor in the scheduling rate for that NT. The buffer in the NT has to handle up to three contention phenomena: arrival distribution related contention, data rate adaptation related contention, and contention due to a temporary throughput reduction caused by deterioration of the UNI data channel quality (the latter in particular for DSL or wireless connections). The target status or steady state may then for instance be a threshold at a given fraction of the maximum buffer filling caused by a given arrival distribution. Filling above that level can be an indication of excessive data rate adaptation related contention and/or deterioration of the UNI data channel quality, which then requires action in the LT. The skilled person will appreciate that depending on the nature and pace of the backpressure signal as received by the LT based on the reporting of the status of the NT's downstream packet buffer, other conditions may be set at the LT downstream scheduler to reduce the scheduling rate for data packet transfer to the NT.

The factor applied to reduce the scheduling rate may vary in function of the backpressure signal. A higher fill level or faster growth of the fill level may require the LT to apply a higher reduction factor to the scheduling rate in order to avoid buffer overrun at the NT.

As mentioned here above, a change in the fill level and/or the duration of such a change as reported by the NT will trigger a change in the rate at which data packets destined to that NT are scheduled at the LT. In certain embodiments of the LT, the downstream scheduler may react on a status report by increasing the scheduling rate for data packet transfer to an NT by a factor, for example until it receives status information indicating that the fill level of the NT's downstream rate adaptation contention buffer has again exceeded a certain threshold. Temporarily increasing the scheduling rate for data packet transfer to one or more UNIs served by an NT may for instance be triggered when the status information in the backpressure signal received from that NT indicates that the fill level of its buffer has dropped below a predetermined threshold. This threshold may be a single predefined threshold, a drop below of which is reported by setting a single bit in the backpressure signal to zero. The threshold also may be one out of multiple predefined buffer size thresholds, a drop below of which can be reported by setting a dedicated bit associated with that size threshold in the backpressure signal equal to zero or by incorporating a specific codepoint associated with that size threshold in the backpressure signal. The factor applied for increasing the downstream scheduling rate may be different for different size thresholds. A drop below a lower size threshold of multiple buffer size thresholds may for instance result in the scheduling rate being increased by a higher factor than a drop below a higher size threshold out of the set of buffer size thresholds. Increasing the scheduling rate for data packets to a particular NT may also be triggered when the growth of the fill level drops below a certain threshold, for instance in case of a negative growth. If the status report contains an absolute value of the fill level of the buffer, the status reported by the NT may for instance be compared with the previous status report of that NT. The difference between both is a measure for the fill level growth. As long as this fill level growth stays below a predefined fill level growth threshold, the downstream scheduler in the LT may increase the scheduling rate to one or more UNIs served by the NT, allowing the NT to take a bigger share in the downstream capacity of the distribution network. The applied factor may vary in function of the fill level growth threshold if plural fill level thresholds are predefined. A smaller positive growth or a bigger negative growth of the buffer fill level of an NT may result in a higher scheduling rate increase factor being applied by the LT.

The factor applied to increase the scheduling rate may vary in function of the backpressure signal. A smaller fill level or smaller growth of the fill level may allow the LT to apply a higher increase factor to the scheduling rate.

FIG. 1 shows a passive optical network comprising an optical line termination 110 or OLT, an optical distribution network 130 or ODN, and a plurality of optical network units 140, 140', 140" or ONU. The optical distribution network 130 comprises a feeder fibre 135 extending from the OLT 110, an optical splitter 134 and plural distribution fibres 131, 132, 133 coupling the optical splitter 134 to respective optical network units 140, 140', 140"". The optical line termination 110 comprises plural per-user traffic managers 111, 112, 113, each comprising a per-user packet buffer 121, 122, 123 or PU-TM. The optical line termination 110 further comprises a downstream scheduler 114 coupled to outputs of the per-user traffic managers 121-123, a downstream media access controller 115 or DS MAC, an upstream media access controller 116 or US MAC, and an optical transceiver 117 or TRX. In FIG. 1, the optical network units 140, 140' and 140" are each supposed to serve a single user network interface or UNI, respectively denoted 144, 144' and 144". Each of the optical network units 140, 140' and 140" comprises an optical transceiver TRX, respectively referenced by 141, 141' and 141", a downstream media access controller DS MAC, respectively referenced by 142, 142' and 142", a downstream packet buffer, respectively referenced by 143, 143' and 143", a user network interface UNI, respectively referenced by 144, 144', 144" and UNI, a downstream packet buffer monitor MTR, respectively referenced by 145, 145' and 145", and an upstream media access controller US MAC respectively referenced by 146, 146' and 146". It is further assumed that downstream data packets destined for the UNI 144 in ONU 140 are at the OLT 110 temporarily stored in the buffer 121 of the first per-user traffic manager 111. Similarly, it is assumed that downstream data packets destined for the UNI 144' in ONU 140' are at the OLT 110 temporarily stored in the buffer 122 of the second per-user traffic manager 112, and downstream data packets destined for the UNI 144" in ONU 140" are at the OLT 110 temporarily stored in the buffer 123 of the third per-user traffic manager 113. The downstream data packets destined to the UNIs 144, 144', 144" served by the ONUs 140, 140' and 140" are selected and scheduled for transmission by the scheduler 114, and downstream transmitted through the shared feeder fibre 135 by the downstream media access controller 115 and optical transceiver 117. The splitter 134 passively splits the optical signal in downstream direction such that each of the transceivers 141, 141', 141" in ONUs 140, 140', 140" receives the same optical signal. The downstream media access controllers 142, 142', 142" at each one of the ONUs 140, 140', 140" extract from the received downstream signal the data packets that are destined for the respective UNI 144, 144', 144" served, and stores these data packets in the downstream data packet buffer 143, 143', 143". Thus, DS MAC 142 selects the downstream packets destined for UNI 144 from the received downstream signal and stores these data packets in downstream packet buffer 143, DS MAC 142' selects the downstream packets destined for UNI 144' from the received downstream signal and stores these data packets in downstream packet buffer 143', and DS MAC 142" selects the downstream packets destined for UNI 144" from the received downstream signal and stores these data packets in downstream packet buffer 143". Temporary storage of data packets destined for UNI 144 in downstream packet buffer 143 shall for instance absorb downstream data rate adaptation contention resulting from aggregate downstream data rates from the OLT 110 that exceed the maximum physical layer egress data rate of the individual UNI 144 at the ONU 140. This downstream data rate adaptation contention may for instance result from absence of downstream data packets to be sent to the other ONUs 140' and 140" as a result of which the downstream scheduler 114 at OLT 110 shall increase the share in bandwidth on the feeder fibre 135 for ONU 140. The downstream data rate adaptation contention may alternatively for instance result from a drop in quality and capacity of the egress link of UNI 144 towards end user equipment. In a similar way, downstream packet buffer 143' absorbs downstream data rate adaptation contention for UNI 144' and downstream packet buffer 143" absorbs downstream data rate adaptation contention for UNI 144". In order to be able to absorb the downstream data rate contention using downstream data buffers 143, 143', 143" whose fill capacity remains feasible in internal memory, a backpressure mechanism is implemented by the downstream packet buffer monitors 145, 145', 145" and upstream media access controllers 146, 146', 146" in the ONUs 140, 140', 140". This backpressure mechanism shall help the upstream media access controller 116 and downstream scheduler 114 at the OLT 110 to schedule downstream transmissions to UNIs 144, 144' and 144" with reduced risk for buffer overrun or buffer underrun at the ONUs 140, 140', 140" while allowing a cost-efficient implementation of these buffers in internal memory. The backpressure mechanism will be described in more detail further below.

Figure 2:
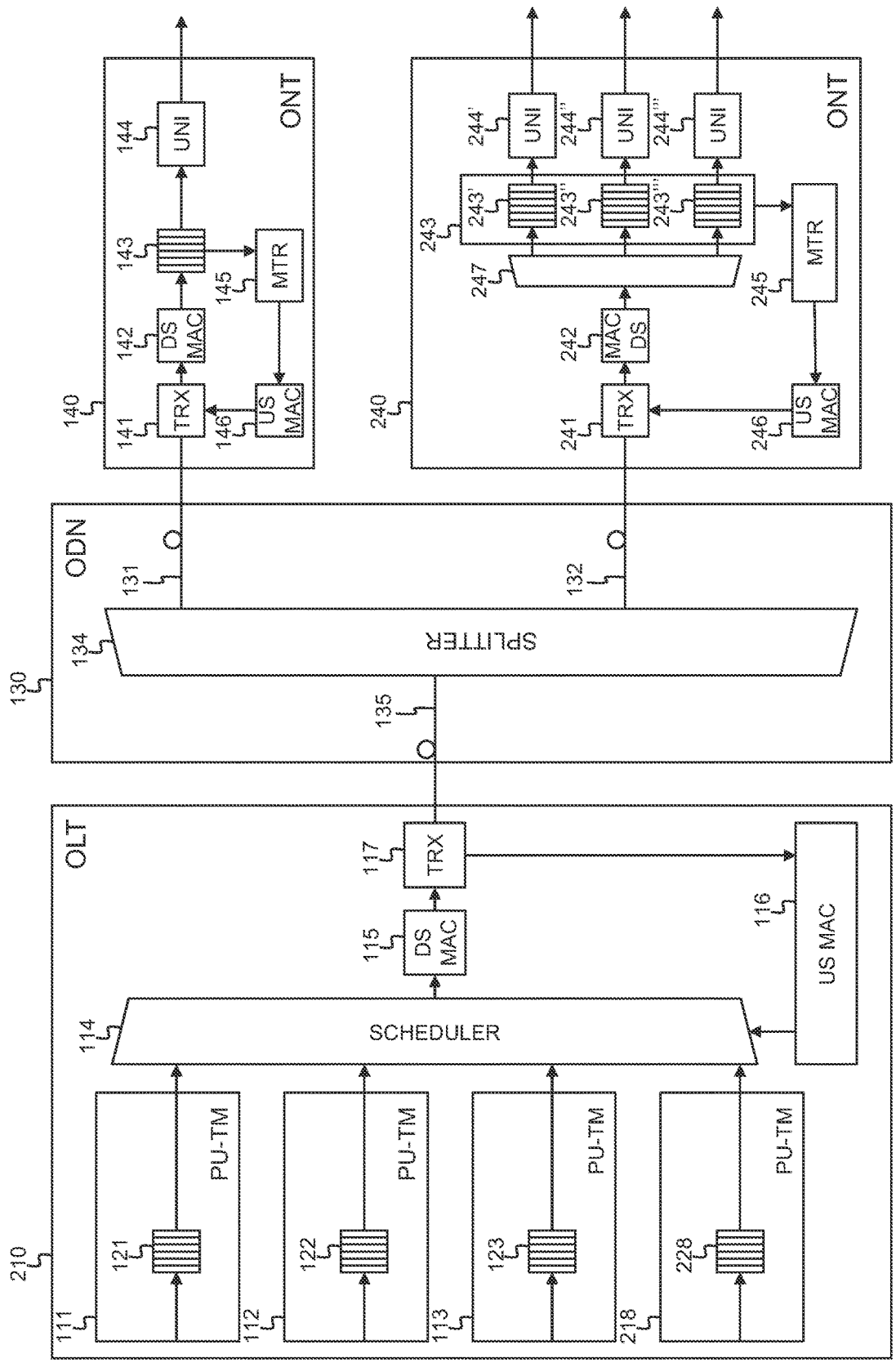
FIG. 2 illustrates a second example embodiment of a system comprising a line termination unit 110, distribution network 130, and network termination units 140, 240.

FIG. 2 shows a passive optical network that differs from the one illustrated by FIG. 1 in that the splitter 134 is coupled via distribution fibre 132 to an ONU 240 that serves three different user network interfaces or UNIs, referenced by 244', 244" and 244'". It is noticed that elements with identical reference numbers in FIG. 1 and FIG. 2 have identical functions. The ONU 240 comprises in addition to an optical transceiver TRX or 241, downstream media access controller DS MAC or 242 also a packet classifier 247 and a downstream packet buffer 243 having three different queues 243', 243" and 243'". Each of these queues stores the downstream travelling data packets destined for one particular UNI served by ONU 240: queue 243' temporarily stores downstream packets destined for UNI 244', queue 243" temporarily stores downstream packets destined for UNI 244", and queue 243'" temporarily stores downstream packets destined for UNI 244'. The downstream data packets, received by transceiver 241 and selected by DS MAC 242 are classified in the appropriate queue, i.e. either 243', 243" or 243'", by the packet classifier 247, depending on the destined UNI. It is noticed that the queues 243', 243" and 243'" preferably are logical queues dynamically sharing a single physical internal memory that implements the downstream packet buffer 243. The status of the downstream packet buffer 243 is monitored by the downstream packet buffer monitor 245 and reported to the OLT 210 by the upstream media access controller 246 in back-pressure signals. The status may be monitored and reported at the level of the aggregate downstream packet buffer 243 or in more advanced embodiments at the level of the individual queues 243', 243", 243'". FIG. 2 further shows at the OLT 210 the presence of four per-user traffic managers PU-TM, denoted 111, 112, 113 and 218, each hosting a respective per-user packet buffer 121, 122, 123 and 228. It is assumed that downstream data packets destined for the UNI 144 in ONU 140 are at the OLT 210 temporarily stored in the buffer 121 of the first per-user traffic manager 111. Similarly, it is assumed that downstream data packets destined for the UNI 244' in ONU 240 are at the OLT 210 temporarily stored in the buffer 122 of the second per-user traffic manager 112, downstream data packets destined for the UNI 244" in ONU 240 are at the OLT 210 temporarily stored in the buffer 123 of the third per-user traffic manager 113, and downstream data packets destined for the UNI 244" in ONU 240 are at the OLT 210 temporarily stored in the buffer 228 of the fourth per-user traffic manager 218.

Figure 3:
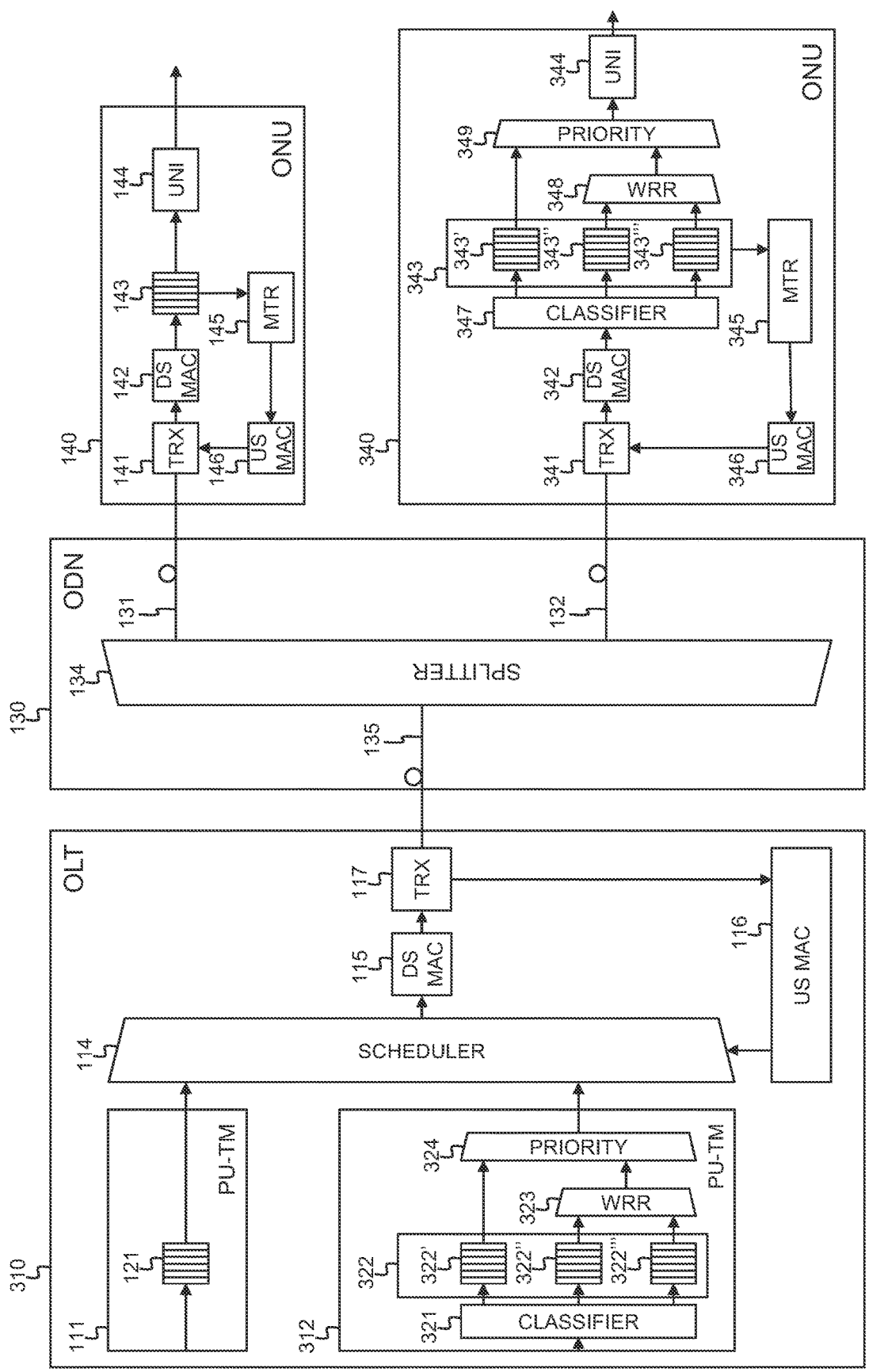
FIG. 3 illustrates a third example embodiment of a system comprising a line termination unit 310, distribution network 130, and network termination units 140, 340.

FIG. 3 shows a passive optical network that differs from the one illustrated by FIG. 1 in that the splitter 134 is coupled via distribution fibre 132 to an ONU 340 with Quality of Service (QoS) awareness and also the OLT 110 is equipped with a per-user traffic manager 312 with QoS awareness. It is noticed that elements with identical reference numbers in FIG. 1 and FIG. 3 have identical functions. The ONU 340 comprises in addition to an optical transceiver TRX or 341, downstream media access controller DS MAC or 342 and single UNI 344 also a packet classifier 347, a downstream packet buffer 343 having three different queues 343', 343" and 343''', a weighted round robin scheduler 348 and a priority scheduler 349. Each of the queues 343', 343" and 343''' stores downstream travelling data packets destined for UNI 344 that belong to a single QoS class: queue 343' temporarily stores downstream packets destined for UNI 344 belonging to a first QoS class, queue 343" temporarily stores downstream packets destined for UNI 344 belonging to a second QoS class, and queue 343''' temporarily stores downstream packets destined for UNI 344 belonging to a third QoS class. The downstream data packets, received by transceiver 341 and selected by DS MAC 242 are classified in the appropriate queue, i.e. either 343', 343" or 343''', by the packet classifier 347, depending on the QoS class they belong to. After temporary storage, the packets belonging to the second and third QoS class are scheduled according to a weighted round robin algorithm by the weighted round robin scheduler 348. Packets belonging to the first QoS class may be prioritized over the packets belonging to the second and third QoS class through the priority scheduler 349. It is noticed that the queues 343', 343" and 343''' preferably are logical queues dynamically sharing a single physical internal memory that implements the downstream packet buffer 343. The status of the downstream packet buffer 343 is monitored by the downstream packet buffer monitor 345 and reported to the OLT 110 by the upstream media access controller 346 in back-pressure signals. The status may be monitored and reported at the aggregate level of the downstream packet buffer 343 or in more advanced embodiments at the level of the individual QoS queues 343', 343", 343'''. FIG. 3 further shows at the OLT 110 the presence of two per-user traffic managers PU-TM, denoted 111 and 312, each hosting a respective per-user packet buffer 121 and 322. It is assumed that downstream data packets destined for the UNI 144 in ONU 140 are at the OLT 110 temporarily stored in the buffer 121 of the first per-user traffic manager 111. Similarly, it is assumed that downstream data packets destined for the UNI 344 in ONU 340 are at the OLT 110 temporarily stored in the buffer 322 of the second per-user traffic manager 312. The second per-user traffic manager 312 also has QoS awareness. Its buffer 322 has three different queues, 322', 322" and 322', each storing packets of a single QoS class. A weighted round robin scheduler 323 selects packets from the second or third QoS class according to a weighted round robin algorithm. Packets belonging to the first QoS class may be prioritized over the packets belonging to the second or third QoS class by a priority scheduler 324. Scheduler 114 at last schedules how the shared capacity of the optical distribution network 130 is divided between traffic destined to UNI 144 and traffic destined to UNI 344.

The skilled person will appreciate that further embodiments may comprise ONUs that serve multiple UNIs (like ONU 240 in FIG. 2) with QoS awareness (like ONU 340 in FIG. 3).

In each ONU 140-140", 240, 340 of the embodiments illustrated by FIG. 1-3, the downstream packet buffer monitor 145-145", 245, 345 monitors the status of the downstream packet buffer 143-143", 243, 343. The status corresponds to any measure indicative for the filling level (like for instance the absolute filling level, the crossing of one or more predefined thresholds in upward or downward direction) or any measure indicative for the variation of the filling level over time (for instance the duration of a certain minimum filling level, or the time interval wherein the filling level varies from a first threshold to a second threshold, or the filling level delta between a first point in time and second point in time, etc.). In the example of ONU 240, the downstream packet buffer monitor 245 may determine the status at queue level, meaning that the filling level or the variation in filling level may be determined individually for the queues 243', 243" and 243' although these queues share a single physical memory. Alternatively, the downstream packet buffer monitor 245 may determine the status at aggregate buffer level, i.e. a single status for the entire downstream packet buffer 243. In the example of ONU 340, the downstream packet buffer monitor 345 may also determine the status at queue level, meaning that the filling level or the variation in filling level may be determined individually for the QoS queues 343', 343" and 343" although these queues share a single physical memory and serve a single UNI 344. Alternatively, the downstream packet buffer monitor 345 may determine the status at aggregate buffer level, i.e. a single status for the entire downstream packet buffer 343. It is noticed that for typical applications, the latter level of detail wherein the share in the downstream packet buffer 343 by individual QoS queues 343', 343", 343" is monitored, may not be very useful as the QoS scheduling discipline in the ONU 340 (by the weighted round robin scheduler 348 and priority scheduler 349) for transferring data packets from its set of QoS queues 343', 343", 343" to the physical UNI output port 344 will manage the fraction taken by each individual QoS queue 343', 343", 343" in the aggregate downstream packet buffer 343. The QoS aware scheduling between QoS specific queues 343', 343", 343' serving a same UNI output port 344 in the ONU 340 does however not imply that a same QoS aware scheduling between QoS specific queues 322', 322", 322' in the OLT 310 can be omitted.

The status of the downstream packet buffer or monitored set of queues therein is reported by the upstream media access controller 146-146", 246, 346 that embeds the status information in a back-pressure signal for upstream transmission by the transceiver 141-141", 241, 341 to the OLT 110, 210, 310. The status of the downstream packet buffer 143-143", 243, 343 or set of queues therein may be measured by the downstream packet buffer monitor 145-145", 245, 345 with a resolution that may vary depending on the implementation. The resolution may determine the nature of the back-pressure signals. In a first example, the resolution may for instance be binary: the fact that a single or multiple filling threshold(s) in the downstream packet buffer 143-143", 243, 343 or one or more queues therein is crossed or not, can be reported through setting one or more bits in the back-pressure signal. In a second example, a range of status code-points may be used in the back-pressure signal to indicate to the OLT 110, 210, 310 that the filling level of the downstream packet buffer 143-143", 243, 343 or a queue therein reaches a particular segment of the buffer or queue. In yet another example implementation, the buffer or queue length itself—e.g. the minimum number of packets left in the downstream packet buffer 143-143", 243, 343 or a queue therein since the last data reception—is determined by the downstream packet buffer monitor 145-145", 245, 345 at specified times and upstream reported by the media access controller 146-146", 246, 346 to the OLT 110, 210, 310 as an absolute value or set of absolute values.

The media access controller 146-146", 246, 346 transmits the monitored status of the downstream packet buffer or its queues to the OLT 110, 210, 310 at times that are also dependent on the implementation. In a first example implementation, the status of the downstream packet buffer 143-143", 243, 343 or the queues therein is upstream transmitted at regular interval times, irrespective of the change in status since the last measurement. In a second example implementation, the status of the downstream packet buffer 143-143", 243, 343 or its queues is only reported at the occasion of a meaningful event, for instance the passing of one or several predefined fill level thresholds. In yet another example implementation, the status of the downstream packet buffer 143-143", 243, 343 or its queues is upstream reported at each arrival of a new packet in the buffer or queue. It is noticed that the latency in the feedback loop must be small enough, in order to avoid that the ONU 140-140", 240, 340 still has to be equipped with a cost-ineffective, large amount of packet buffer memory for avoiding buffer overrun, i.e. for absorbing an excessive data volume between detection of an increasing filling level of the downstream packet buffer 143-143", 243, 343 and a data flux reduction by the OLT 110, 210, 310, and for avoiding buffer underrun, i.e. for keeping the UNI 144-144", 244'-244", 344 served by the ONU 140-140", 240, 340 loaded as much as possible between detection of a decreasing filling level and a data flux increase by the OLT 110, 210, 310.

At the OLT 110, 210, 310, the back-pressure signals are received by the optical transceiver 117 and the upstream media access controller 116 reconstructs the status information per individual back-pressured entity, i.e. per individual downstream packet buffer 143-143", 243, 343 or per queue 243'-243"', 343'-343"' therein. The media access controller 116 assesses the deviation of the status of a downstream packet buffer 143-143", 243, 343 or queue 243'-243"', 343'-343"' therein relative to either a previous status report of the concerned buffer or queue, or relative to a target status for the downstream packet buffer 143-143", 243, 343 or queue 243'-243", 343'-343"' therein that was calibrated for a steady state condition. Also the duration of a buffer or queue status that deviates in either sense can be taken into account.

Such a change in the use of a downstream packet buffer 143-143", 243, 343 or queue 243'-243"', 343'-343"' therein reported by an ONU 140-140", 240, 340, and/or the duration of such a change may trigger a change in the rate at which data packets will be scheduled for downstream transmission from the OLT 110, 210, 310 to the concerned ONU 140-140", 240, 340 by the scheduler 114 in the OLT 110, 210, 310. The rate change applied by the scheduler 114 can be with a factor less than linearly proportional, a factor linearly proportional, or a factor higher than linearly proportional to the deviation in the perceived buffer or queue status. The rate change factor may also vary with the duration of the status deviation.

In an example implementation, an ONU 140-140", 240, 340 reports the exceeding of a predetermined size threshold in the downstream packet buffer 143-143", 243, 343 that is used for all egress traffic to UNIs 144-144", 244'-244"', 344 served by the ONU 140-140", 240, 340 by setting a corresponding back-pressure bit in the back-pressure signal. The scheduler 114 in the OLT 110, 210, 310, on reception of the set bit, will stop scheduling data for transfer to that ONU 140-140", 240, 340. It will do so until it detects that the corresponding back-pressure bit in the back-pressure signal for that ONU 140-140", 240, 340 is again reset, meaning that the aggregate downstream packet buffer filling in the ONU 140-140", 240, 340 dropped below the predetermined size threshold.

In another example implementation, an ONU 240 reports the exceeding of a size threshold in a partition of the downstream data buffer 243, the partition being used for all egress traffic assigned to a single UNI 244' served by the ONU 240, possibly traffic that spans multiple QoS queues if the OLT and ONU are QoS aware, by setting a corresponding back-pressure bit in the upstream back-pressure signal for that UNI 244'. The OLT 210, upon reception of the set bit, will stop scheduling data for transfer to that UNI 244'. It will do so until it detects the corresponding back-pressure bit in the back-pressure signal for that UNI 244' is again reset, meaning that the buffer filling in the ONU 240 for UNI 244' dropped below the threshold.

In a further example implementation, an ONU 240 reports the exceeding of one of multiple size thresholds in a partition of the aggregate downstream packet buffer 243, the partition being used for all egress traffic assigned to a single UNI 244" served by the ONU 240, possibly traffic that spans multiple QoS queues if the OLT and ONU are QoS aware, by setting a corresponding back-pressure bit in the back-pressure signal for that UNI 244". The OLT 210 will reduce the rate at which data is scheduled for transfer to that UNI 244" by a factor depending on the threshold that is crossed, on reception of the status information in the back-pressure signal. The OLT 210 will increase the rate at which data is scheduled for transfer to that UNI 244" by another factor depending on the threshold that is no longer exceeded, on reception of the status information in the back-pressure signal.

In yet another example implementation, the scheduler 114 in the OLT 310 will reduce the rate at which data is scheduled for transfer to an ONU 340, or to one of its UNIs 344, by a configurable factor on reception of the set bit. The OLT 310 will increase the rate at which data is scheduled for transfer to that ONU 340, or to one of its UNIs 344 by another configurable factor. The scheduling of data packets for transfer to that ONU 340 or to one of its UNIs 344 happens by selection of data from multiple queues 322'-322"' based on QoS criteria, and the data rate resulting from the assessment of the downstream data queue occupancy as sent by the ONU 340.

The skilled person will appreciate that the above examples are not limitative and many other examples can be imagined wherein status information for a downstream packet buffer or queue in an ONU upstream reported by that ONU via back-pressure signals can be exploited at the OLT for scheduling future downstream transmission to the concerned ONU, a particular UNI served by the ONU, or even a particular QoS class.

Thanks to the invention, the necessary data buffer provisions that are needed for handling varying traffic conditions in the combined LT/NT system, can be located for a larger part in the LT. As this part of the shared medium system is common for all destinations of the system, it offers an opportunity for statistical buffer resource sharing and hence buffer resource saving compared to known designs wherein the buffer resources are independently specified for traffic conditions in the LT on one side, and each NT on the other side, without a possibility to communicate. In addition, the buffer resource usage can be optimized where it tends to be more critical, at the NT side.

The ONU 140-140", 240, 340 transmits the relevant status(es) of the downstream packet buffer 143-143", 243, 343 or any queue 243'-243", 343'-343'" therein to the OLT 110, 210, 310. The back-pressure signals incorporating the status information may for instance be embedded in a separate message at the physical layer management layer, or at the Ethernet data link layer. such implementation will result in some extra overhead in upstream direction. Its advantage however is that the overhead is present only when actually needed, i.e. when a meaningful change in the status of the NT downstream buffer and/or queue occurs. The latency that can be tolerated between the change event, generation of the upstream back-pressure signalling, and the effect on the concerned downstream data flows is determined by the amount of data buffering memory that can be supported in a cost-efficient manner in the NT. A data buffer of 10 Mbit, which can be realized in application specific internal memory, offers a latency tolerance of 1 millisecond for back-pressure on a shared medium with downstream capacity of 10 Gb/s. This would for instance be sufficient for GPONs.

Figure 4:
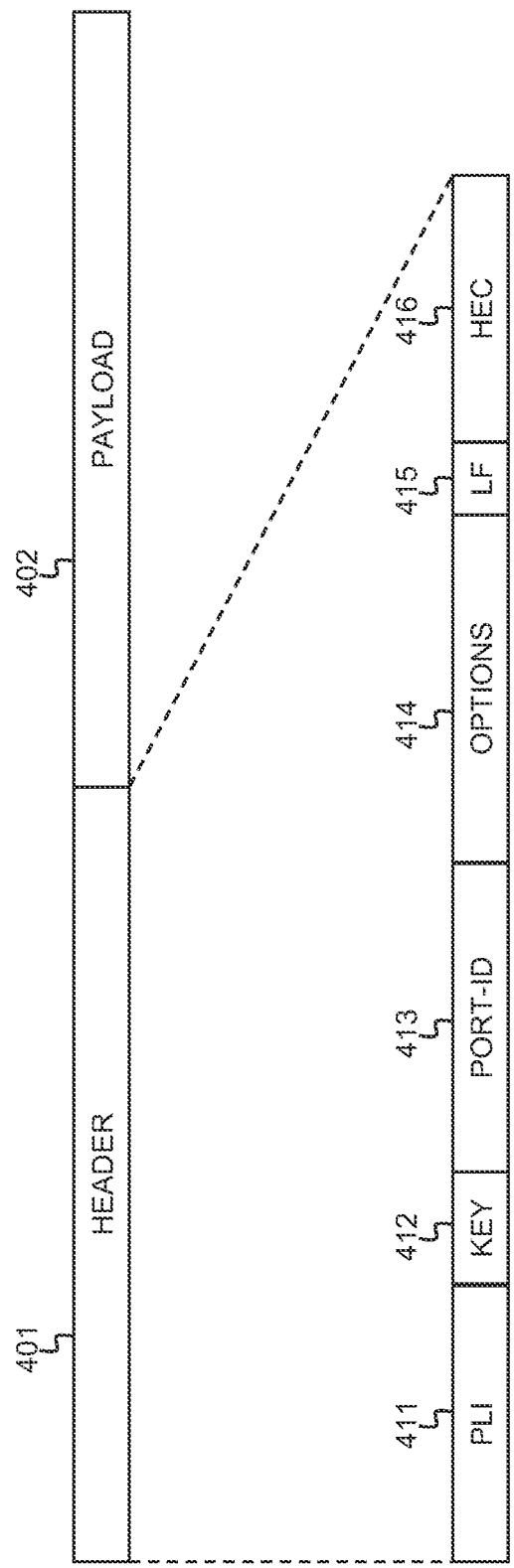
FIG. 4 illustrates upstream back-pressure signalling in example embodiments of the system according to the invention.

Alternatively, as illustrated by FIG. 4, the back-pressure signals may be embedded in a fixed position of an existing overhead channel frame, like for instance the currently unspecified or unused Options field 414 in the upstream XGEM header 401 of an XGSPON data frame. This header 401 precedes a data block transmitted in the payload section 402 of the XGEM upstream data frame and comprises a 14 bit long PLI field 411, a 2 bit long KEY index field 412, a 16 bit long PORT-ID field 413, an 18 bit long OPTIONS field 414, a 1 bit LF field 415 and a 13 bit long HEC field 416. The PLI field 411 or payload length indication field encodes the length of an expanded Ethernet frame or jumbo Ethernet frame that is not necessarily equal to the length of the payload section 402. The KEY index field 412 contains a 2 bit identifier of the data encryption key that is used to encrypt the payload 402, i.e. either the unicast or broadcast key type. The PORT-ID field 413 contains the identifier of the XGEM port whereto the data frame belongs. The LF field 415 contains a last fragment indicator, i.e. a bit set 1 to indicate that the fragment encapsulated in the XGEM data frame is the last fragment of an SDU (Service Data Unit) or a complete SDU. The HEC field 416 contains a hybrid error detection and correction code for the initial bits of the header 401. The Options field 414 of 18 bits can be used to communicate an ONU downstream buffer and/or queue filling status. The XGEM header 401 occurs N times per 125 microseconds super-frame for each ONU in the GPON. N has a relation to the amount of downstream packets to be scheduled to the ONU in that frame period. This implies that a channel with a bandwidth equal to N×8000×18 bits per second is available from each ONU to the OLT. The Options field 414 is available in XGEM data blocks with actual payload, and in IDLE XGEM data blocks. The number of such blocks is controlled by the OLT, hence so is the Options channel.

The status of the aggregate downstream packet buffer or possibly a share of this buffer that is storing the set of QoS queues for an individual UNI can be embedded in a status frame that may span the Options field in one or more XGEM frames as follows:

2 bits of the 18 bit long Options field 414 indicate the position of the remaining 16 bit chunk in the complete status frame: start of the status frame, continuation of the status frame, end of the status frame, and possibly entire frame within a single Options field; and 16 bits of the 18 bit long Options field 414 are used to for the status frame (or a part thereof) indicating the status of the ONU downstream buffer and/or provisioned UNI queue sets or UNI QoS queue sets.

The status frame may have a fixed length, with an actual status indication for each concerned buffer or queue set, whether changed or not. In this case the buffer or queue set to which a status applies can be derived from the position of the status in the filling status frame. Alternatively, the status frame may have a variable length, with an actual status indication only for the concerned buffer or queue sets that exhibit a meaningful change relative to the previously communicated status. In this case a concerned buffer or queue set identification is required per status. In addition, a single field status frame can be used to communicate emergency back-pressure signals for particular events, like for instance aggregate downstream packet buffer overflow.

Figure 5:
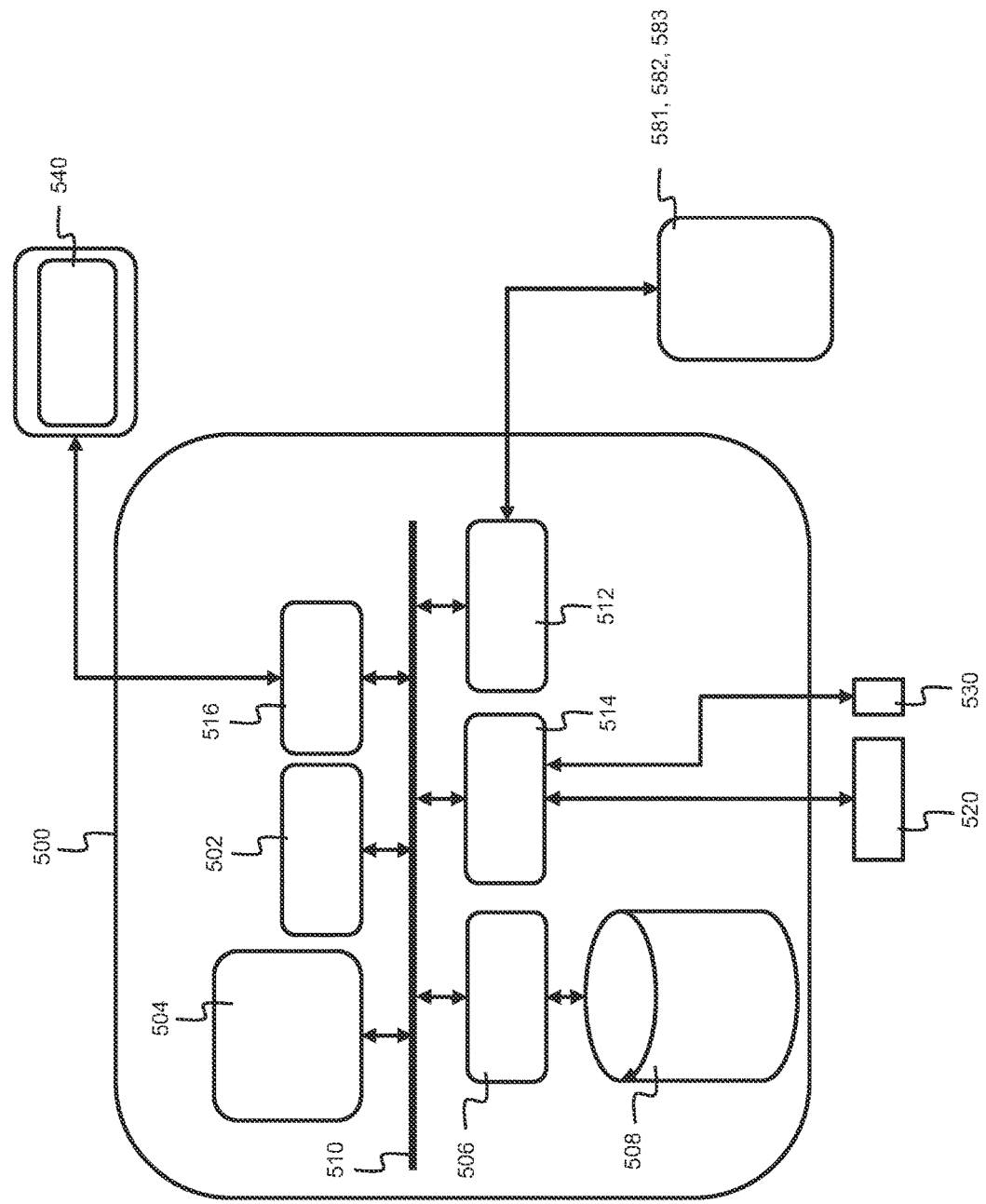
FIG. 5 shows an example embodiment of a suitable computing system 500 for performing one or several steps in embodiments of the invention.

FIG. 5 shows a suitable computing system 500 enabling to implement embodiments of the back-pressure mechanism according to the invention. Computing system 500 may in general be formed as a suitable general-purpose computer and comprise a bus 510, a processor 502, a local memory 504, one or more optional input interfaces 514, one or more optional output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator or user to input information to the computing device 500, such as a keyboard 520, a mouse 530, a pen, voice recognition and/or biometric mechanisms, a camera, etc. Output interface 516 may comprise one or more conventional mechanisms that output information to the operator or user, such as a display 540, etc. Communication interface 512 may comprise any transceiver-like mechanism such as for example one or more Ethernet interfaces that enables computing system 500 to communicate with other devices and/or systems, for example with other computing devices 581, 582, 583. The communication interface 512 of computing system 500 may be connected to such another computing system by means of a local area network (LAN) or a wide area network (WAN) such as for example the internet. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD, -ROM disk, solid state drives, flash memory cards, . . . could be used. Computing system 500 could thus correspond to controller circuitry deployed in the LT or NT of FIG. 1-3.

As used in this patent application, the term "circuitry" may refer to one or more or all of the following:

(a) hardware-only circuit implementations such as implementations in only analogue and/or digital circuitry and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. An optical network unit configured to be connected to an optical distribution network with point-to-multipoint architecture that couples an optical line termination to a plurality of optical network units including said optical network unit to jointly form a passive optical network, wherein said optical network unit comprises:

a downstream receiver configured to receive data packets downstream transmitted from said optical line termination to said plurality of optical network units;

one or more user network interfaces configured to interface with respective user equipment of respective users;

a downstream packet buffer for temporary storage of data packets received by said downstream receiver and destined for said one or more user network interfaces;

a downstream packet buffer monitor configured to monitor the status of said downstream packet buffer and to generate back-pressure signals indicative of said status, wherein said status corresponds to a fill level or fill level variation of said downstream packet buffer; and an upstream transmitter configured to upstream transmit said back-pressure signals to said optical line termination, wherein said back-pressure signals are transmitted in an Options field of an upstream frame header.

2. The optical network unit of claim 1, wherein said status comprises information directly or indirectly indicative of the risk of buffer overrun resulting from an excessive share of data packets destined for said one or more user network interfaces in said data packets downstream transmitted by said optical line termination.

3. The optical network unit of claim 1, wherein:

said downstream packet buffer comprises user network interface related queues associated with respective ones of said one or more user network interfaces; and said status comprises a status for each of said one or more user network interface related queues.

4. The optical network unit of claim 1, wherein:

said downstream packet buffer comprises plural quality-of-service related queues associated with respective quality-of-service classes; and said status comprises a status for each of said quality-of-service related queues.

5. The optical network unit of claim 1, wherein said back-pressure signals are transmitted in the Options field of the upstream frame header as specified in an ITU-T PON specification.

6. The optical network unit of claim 1, wherein:

said optical network unit is a Digital Subscriber Loop multipoint transceiver unit at remote side (DSL MTU-R).

7. An optical line termination configured to be connected to an optical distribution network with point-to-multipoint architecture that couples said optical line termination to a plurality of optical network units, wherein said optical line termination comprises:

a plurality of per-user traffic managers, each per-user traffic manager comprising a per-user packet buffer configured to temporarily store data packets destined for a particular user network interface of one of said optical network units;

a downstream scheduler configured to schedule downstream transmission of data packets across said plurality of per-user traffic managers; and an upstream receiver configured to receive back-pressure signals upstream transmitted by said plurality of optical network units, each back-pressure signal being indicative of the status of a downstream packet buffer in an optical network unit of said plurality of optical network units, wherein said status corresponds to a fill level or fill level variation of said downstream packet buffer, wherein said back-pressure signals are received in an Options field of an upstream frame header;

said downstream scheduler being configured for shaping and/or scheduling future downstream transmission of data packets based on said back-pressure signals.

8. The optical line termination of claim 7, wherein said downstream scheduler is configured to stop scheduling data packets destined to a particular user network interface if:
said backpressure signal indicates that a fill level of said downstream packet buffer exceeds a threshold; or
said backpressure signal indicates that a fill level growth of said downstream packet buffer exceeds a threshold; or
said backpressure signal indicates that a fill level of said downstream packet buffer approximates a target fill level.

9. The optical line termination of claim 7, wherein said downstream scheduler is configured to reduce the rate of scheduling data packets destined to a particular user network interface by a factor if:
said backpressure signal indicates that a fill level of said downstream packet buffer exceeds a threshold; or
said backpressure signal indicates that a fill level growth of said downstream packet buffer exceeds a threshold; or
said backpressure signal indicates that a fill level of said downstream packet buffer approximates a target fill level.

10. The optical line termination of claim 9, wherein said factor is configurable based on said backpressure signal.

11. The optical line termination of claim 7, wherein said downstream scheduler is configured to increase the rate of scheduling data packets destined to a particular user network interface by a factor if:
said backpressure signal indicates that a fill level of said downstream packet buffer drops below a threshold; or
said backpressure signal indicates that a fill level growth of said downstream packet buffer drops below a threshold.

12. The optical line termination of claim 11, wherein said factor is configurable based on at least one of said backpressure signals.

13. The optical line termination of claim 7, wherein:
said optical line termination is a Digital Subscriber Loop multipoint transceiver unit at central office side (DSL MTU-O).

14. A network termination method, used in a system with an optical distribution network with point-to-multipoint architecture that couples an optical line termination to a plurality of optical network units, wherein the network termination method comprises:
receiving data packets downstream transmitted from the optical line termination to the plurality of optical network units;
extracting data packets downstream transmitted and destined for one or more user network interfaces configured to interface with respective user equipment of respective users;
temporarily storing the data packets destined for the one or more user network interfaces in a downstream packet buffer;
monitoring the status of the downstream packet buffer and generating back-pressure signals indicative of the status, wherein the status corresponds to a fill level or fill level variation of the downstream packet buffer; and
upstream transmitting the back-pressure signals to the optical line termination, wherein said back-pressure signals are transmitted in an Options field of an upstream frame header.

15. The network termination method of claim 14, wherein at least one of:
said status comprises information directly or indirectly indicative of the risk of buffer overrun resulting from an excessive share of data packets destined for said one or more user network interfaces in said data packets downstream transmitted by said optical line termination.

16. The network termination method of claim 14, wherein one of:
said downstream packet buffer comprises user network interface related queues associated with respective ones of said one or more user network interfaces, and said status comprises a status for each of said one or more user network interface related queues; or
said downstream packet buffer comprises plural quality-of-service related queues associated with respective quality-of-service classes, and said status comprises a status for each of said quality-of-service related queues.

17. A line termination method, used in a system with an optical distribution network with point-to-multipoint architecture that couples an optical line termination to a plurality of optical network units, wherein the line termination method comprises:
temporarily storing data packets destined for a particular user network interface of one of the optical network units in a per-user data buffer of a per-user traffic manager;
scheduling downstream transmission of data packets across a plurality of per-user traffic managers;
receiving back-pressure signals upstream transmitted by the plurality of optical network units, each back-pressure signal being indicative of the status of a downstream packet buffer in an optical network unit of the plurality of optical network units, wherein the status corresponds to a fill level or fill level variation of the downstream packet buffer, wherein said back-pressure signals are received in an Options field of an upstream frame header; and
shaping and/or scheduling future downstream transmission of data packets based on the back-pressure signals.

18. The line termination method of claim 17, including stopping scheduling of data packets destined to a particular user network interface if:
said backpressure signal indicates that a fill level of said downstream packet buffer exceeds a threshold; or
said backpressure signal indicates that a fill level growth of said downstream packet buffer exceeds a threshold; or
said backpressure signal indicates that a fill level of said downstream packet buffer approximates a target fill level.

19. The line termination method of claim 17, including reducing the rate of scheduling data packets destined to a particular user network interface by a factor if:
said backpressure signal indicates that a fill level of said downstream packet buffer exceeds a threshold; or
said backpressure signal indicates that a fill level growth of said downstream packet buffer exceeds a threshold; or
said backpressure signal indicates that a fill level of said downstream packet buffer approximates a target fill level.

20. The line termination method of claim 17, including increasing the rate of scheduling data packets destined to a particular user network interface by a factor if:

said backpressure signal indicates that a fill level of said downstream packet buffer drops below a threshold; or said backpressure signal indicates that a fill level growth of said downstream packet buffer drops below a threshold.

* * * * *